United States Patent
Sohn

(10) Patent No.: US 8,237,613 B2
(45) Date of Patent: Aug. 7, 2012

(54) APPARATUS AND METHOD FOR IDENTIFYING SUBSCRIBER POSITION IN PORTABLE TERMINAL

(75) Inventor: Chang-Ho Sohn, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 186 days.

(21) Appl. No.: 12/760,674

(22) Filed: Apr. 15, 2010

(65) Prior Publication Data

US 2010/0265140 A1     Oct. 21, 2010

(30) Foreign Application Priority Data

Apr. 15, 2009  (KR) .................. 10-2009-0032708

(51) Int. Cl.
*G01S 3/02*  (2006.01)

(52) U.S. Cl. ........................................... 342/464
(58) Field of Classification Search ............. 342/464
See application file for complete search history.

(56) References Cited

U.S. PATENT DOCUMENTS

| | | | |
|---|---|---|---|
| 7,598,853 B2* | 10/2009 | Becker et al. | 340/539.13 |
| 2008/0152034 A1* | 6/2008 | Liu et al. | 375/295 |

* cited by examiner

*Primary Examiner* — Harry Liu
(74) *Attorney, Agent, or Firm* — Cha & Reiter, LLC

(57) ABSTRACT

An apparatus and method for calculating a current position of a portable terminal not supporting a function of obtaining position information, such as a Global Positioning System (GPS) function, by receiving position information from neighbor terminals of the portable terminal are disclosed. The apparatus includes a controller for calculating the current position of the portable terminal from received position information from neighbor terminals and processing the received position to determine the current position.

15 Claims, 4 Drawing Sheets

APPARATUS AND METHOD FOR IDENTIFYING SUBSCRIBER POSITION IN PORTABLE TERMINAL

CLAIM OF PRIORITY

This application claims the benefit of the earlier filing date, under 35 U.S.C. §119(a), of that Korean patent application filed in the Korean Intellectual Property Office on Apr. 15, 2009 and assigned Serial No. 10-2009-0032708, the entire disclosure of which is hereby incorporated by reference in its entirety.

BACKGROUND OF THE INVENTION

1. Field of the Invention

The present invention relates to the field of positional determination and in particular to an apparatus and method for identifying a current position of a portable terminal by receiving the position information from neighbor terminals of the portable terminal.

2. Description of the Related Art

With the rapid development of portable terminals, a mobile phone providing wireless voice call and data exchange is regarded as personal necessity of life. Conventional portable terminals have generally been regarded as portable devices providing wireless calls. However, along with technical advances and introduction of the wireless Internet, portable terminals are now used for many purposes in addition to telephone call or schedule management. For example, images can be captured by using a digital camera included in a portable terminal. Further, the portable terminal provides a variety of functions such as watching a satellite broadcasting program, performing games, remote controlling using near field communication, a user position tracking, etc.

The user position tracking is a function of identifying a position of a user in an emergency situation by using a portable terminal, and is a great help to save lives by identifying the position of the user in the emergency situation.

A method of identifying the user position by using the portable terminal may be a method of identifying a position of a cell by using position registration information of the portable terminal or a method of measuring a position of the portable terminal by receiving a satellite signal according to a Global Positioning System (GPS) function.

The method of using the position registration information of the portable terminal has merit in that an apparatus for receiving information required for position calculation, such as the satellite signal, does not have to be additionally included. However, this method also has a disadvantage in that the position calculation is not accurate as only cell-unit information using the position registration information can be identified.

To solve the aforementioned problem, the method of measuring the position of the potable terminal by receiving the satellite signal is used to recognize a correct position. However, this method has another problem in that cost of the portable terminal rises since an additional device for receiving the satellite signal is employed.

Accordingly, there is a need for an apparatus and method for identifying a current position of a portable terminal not employing an additional device for receiving a satellite signal.

SUMMARY OF THE INVENTION

An exemplary aspect of the present invention is to provide an apparatus and method for calculating a current position of a portable terminal not capable of receiving position information.

Another exemplary aspect of the present invention is to provide an apparatus and method for calculating a current position of a portable terminal not capable of receiving position information by receiving the position information from neighbor terminals of the portable terminal.

Still another exemplary aspect of the present invention is to provide an apparatus and method in which a portable terminal not capable of receiving position information utilizes neighbor terminals capable of receiving the position information for providing the position information.

In accordance with an aspect of the present invention, an apparatus for determining a current position of a subscriber in a portable terminal is provided. The apparatus includes a controller for calculating the current position by receiving position information from neighbor terminals in the process of determining the current position.

In accordance with another aspect of the present invention, a method of determining a current position of a subscriber in a portable terminal is provided. The method includes receiving position information from neighbor terminals in the process of determining the current position, and calculating the current position by using the received position information.

Other exemplary aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

The following description, with reference to the accompanying drawings, is provided to assist in a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. Also, descriptions of well-known functions and constructions may be omitted for clarity and conciseness when their inclusion may obscure appreciation of the subject matter of the claimed invention by a person or ordinary skill in the art.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

The present invention described hereinafter relates to an apparatus and method for calculating a current position of a portable terminal not providing a function of obtaining position information, such as a Global Positioning System (GPS) function, by receiving the position information from neighbor terminals of the portable terminal.

Figure 1:
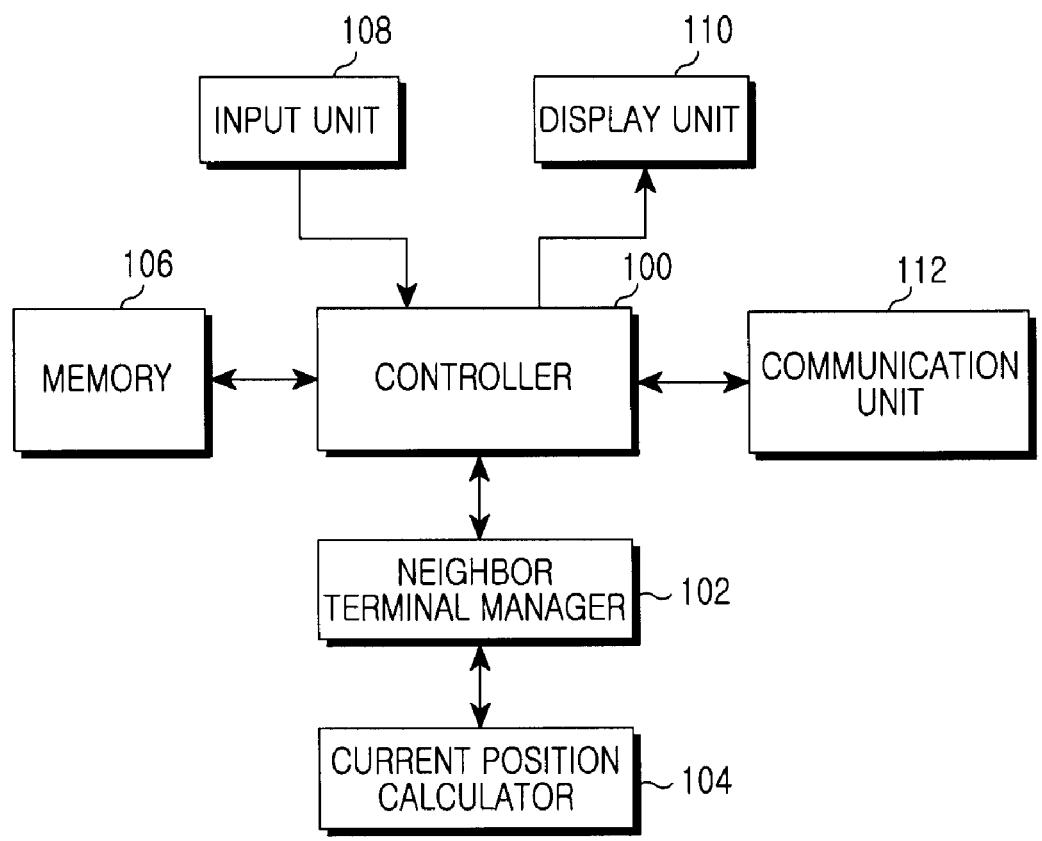
FIG. 1 is a block diagram illustrating a structure of a portable terminal allowing calculation of a current position according to an exemplary embodiment of the present invention.

FIG. 1 is a block diagram illustrating a structure of a portable terminal allowing calculation of a current position according to an exemplary embodiment of the present invention.

Referring to FIG. 1, the portable terminal may include a controller 100, a neighbor terminal manager 102, a current position calculator 104, a memory 106, an input unit 108, a display unit 110, and a communication unit 112 (transceiving unit).

The controller 100 provides overall control of the portable terminal. For example, the controller 100 processes and controls voice calls and data communications, and in addition to its typical function, e.g., media player, camera, etc., the controller 100 processes a function of calculating a current position of a portable terminal. That is, if a process of determining the position of the portable terminal is performed, under the control of the controller 100, position information is received from neighbor portable terminals of the portable terminal and a current position of the portable terminal is calculated by using the received position information. In this case, the controller 100 allows the neighbor terminal manager 102 to determine the neighbor portable terminals so that the position information can be received from the neighbor portable terminals.

Under the control of the controller 100, the neighbor terminal manager 102 manages terminals capable of receiving position information required for calculation of the current position of the portable terminal.

Under the control of the controller 100, the current position calculator 104 calculates the current position of the portable terminal by using the position information received from the neighbor terminals supporting a position determination function, such as a GPS function.

The memory 106 preferably includes, for example, a Read Only Memory (ROM), a Random Access Memory (RAM), a flash ROM, and the like. The ROM stores a microcode (i.e., code) of a program, by which the controller 100 and the current position calculator 104 are processed and controlled, and a variety of reference data.

The RAM is a working memory of the controller 100 and stores temporary data that is generated while programs are performed. The flash ROM stores a variety of rewritable data, such as phonebook entries, outgoing messages, and incoming messages.

The input unit 108 includes a plurality of function keys, such as numeral key buttons of '0' to '9', a menu button, a cancel (or delete) button, an OK button, a talk button, an end button, an Internet access button, a navigation (or direction) key button, a character input key, and the like. Key input data (e.g., a position determination menu), which is input when the user presses these keys, is provided to the controller 100.

The display unit 110 displays information such as state information, which is generated while the portable terminal operates, limited numeral characters, large-sized moving and still pictures, and the like. The display unit 110 may be a color Liquid Crystal Display (LCD), Active Mode Organic Light Emitting Diode (AMOLED), and the like.

The communication unit 112 transmits and receives a Radio Frequency (RF) signal of data that is input and output through an antenna (not shown). For example, in a transmitting process, data to be transmitted may be subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data. The protocol for transmission of signals may be in one of the well-known CDMA and GSM or other similar protocols known in the art. Further, according to the present invention, position information required to calculate the current position of the portable terminal is requested and position information corresponding to the request is received.

Although the functions of the neighbor terminal manager 102 and the current position calculator 104 can be performed by the controller 100 of the portable terminal, the neighbor terminal manager 102 and the current position calculator 104 are separately constructed in the present invention for exemplary purposes only. Thus, those ordinary skilled in the art can understand that various modifications can be made within the scope of the present invention. For example, the functions of the neighbor terminal manager 102 and the current position calculator 104 can be processed together by the controller 100.

An apparatus for calculating a current position of a portable terminal by receiving the position information from neighbor terminals of the portable terminal has been described above. In the following description, a method of calculating a current position of a portable terminal will be described by using the above apparatus according to exemplary embodiments of the present invention.

Figure 2:
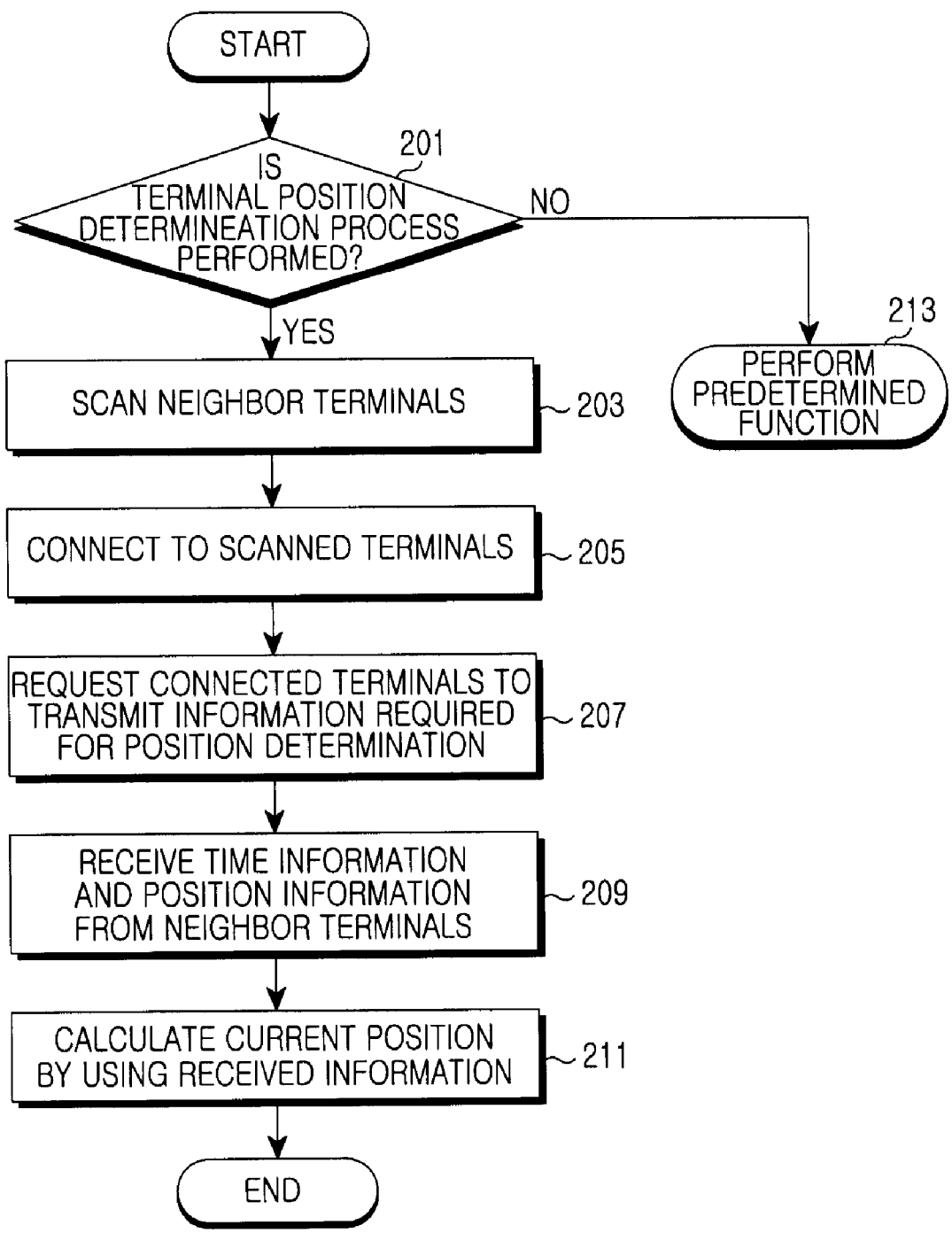
FIG. 2 is a flowchart illustrating an exemplary operational process of determining position information in a portable terminal according to an exemplary embodiment of the present invention.

FIG. 2 is a flowchart illustrating a process of determining position information in a portable terminal according to an exemplary embodiment of the present invention.

Referring to FIG. 2, the portable terminal determines whether a process of determining a position of the portable terminal is performed in step 201. If the position determination process is not performed in step 201, processing proceeds to step 213. At step 213 the portable terminal performs a predetermined function (e.g., a standby mode).

Otherwise, if the position determination process is performed in step 201, processing proceeds to step 203, wherein the portable terminal scans neighbor terminals. In this case, the process of scanning the neighbor terminals is performed to determine whether the neighbor terminals capable of providing information for calculating the current position exist. Each neighbor terminal that is capable of calculating the current position such as a portable terminal supporting a GPS function is determined.

In step 205, the portable terminal establishes a communication connection to the scanned terminals to receive position information from the terminals scanned in step 203. In this case, the portable terminal may connect to the neighbor terminals by using a near field communication technique (e.g., Bluetooth, etc.).

In step 207, the portable terminal requests the terminals connected in step 205, to transmit information necessary for position determination. In step 209, the portable terminal receives time information and a position information from each of the neighbor terminals. In this case, the portable terminal may measure strength of a signal received from each neighbor terminal to calculate a distance to each neighbor terminal.

In step 211, the portable terminal calculates the current position of the portable terminal by using the received information and the distance to each neighbor terminal. The portable terminal may calculate the distance to each neighbor terminal by using the measured position information within pre-determined time.

As an example of the method described herein, it is assumed that the current position of the portable terminal needs to be calculated (e.g., a case of determining a position in a mountain area, or the like) and the number of neighbor terminals supporting a GPS function is three.

Accordingly, by using a communication technique such as Bluetooth, the portable terminal receives the position information transmitted by the (exemplary) three neighbor terminals. Signal strength of each neighbor terminal is measured by the portable terminal to calculate the distance to each neighbor terminal. Then, the portable terminal gathers the position information received from the three terminals, and thus the current position can be calculated by using triangulation. In this manner, a position of a person stuck in a disaster area or a position of a mountain climber in a dangerous situation can be recognized.

Figure 3:
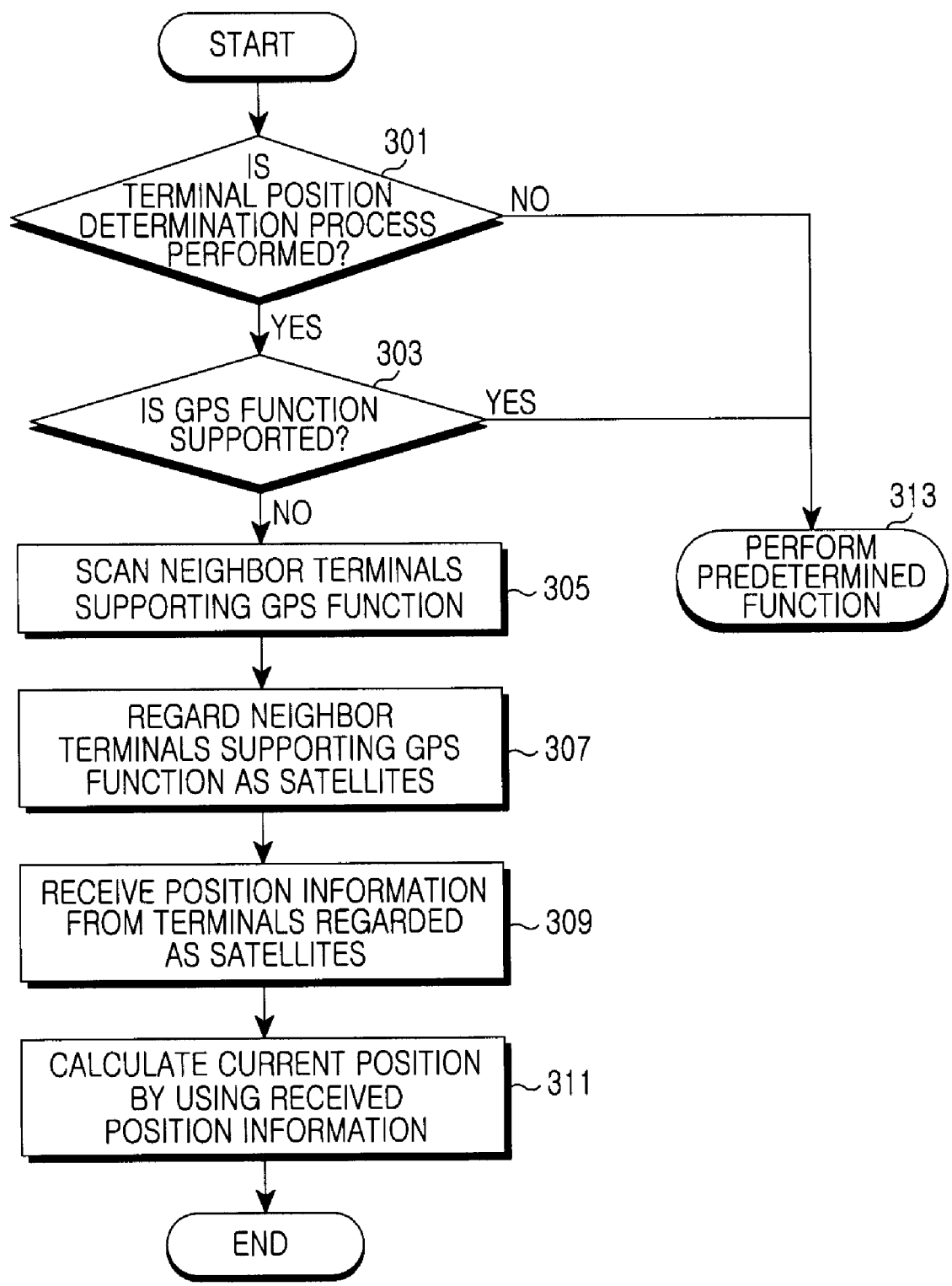
FIG. 3 is a flowchart illustrating an exemplary operational process of determining position information in a portable terminal according to an exemplary embodiment of the present invention.

FIG. 3 is a flowchart illustrating a process of determining position information of a portable terminal according to an exemplary embodiment of the present invention.

Referring to FIG. 3, the portable terminal determines whether a process of determining a position of the portable terminal is performed in step 301. If the position determination process is not performed in step 301, processing proceeds to step 313. At step 313 the portable terminal performs a predetermined function (e.g., a standby mode).

If it is determined that the position determination process is performed, processing proceeds to step 303, where it is determined whether the portable terminal supports a GPS function. If it is determined that the portable terminal supports a GPS function, processing proceeds to step 313. At step 313 the portable terminal performs a predetermined function (e.g., a position determination process using the GPS function).

Otherwise, if it is determined in step 303 that the portable terminal does not support the GPS function, processing proceeds to step 305, where the portable terminal scans neighbor terminals supporting the GPS function by using a scan function of Bluetooth communication protocol. In step 307, the portable terminal allows the neighbor terminals scanned in step 305 to be regarded as satellites. The reason for regarding the neighbor terminals as satellites is to use position information obtained by the neighbor terminals capable of obtaining the position information. That is, this is to allow the portable terminal to obtain the current position by using information obtained by the neighbor terminals capable of obtaining the position information.

In step 309, the portable terminal receives the position information from the neighbor terminals regarded as the satellites in step 307. In this case, the portable terminal may measure a strength of a signal received from each neighbor terminal to determine a distance to each terminal. Therefore, position information of each of the satellites can be received by the portable terminal by using near field communication. Thus the position information of each satellite is received by the portable terminal is similar in effect as if the portable terminal directly receives the GPS satellite information.

In step 311, the portable terminal calculates the current position of the portable terminal by using the position information received from the neighbor terminals regarded as satellites and the distance to each terminal. For example, if the position information is received from three neighbor terminals, the portable terminal may calculate its current position according to triangulation by using the position information of the neighbor terminals and the distance to each neighbor terminal. The portable terminal may transmit the received position information to a specific server or a third-party terminal to calculate the current position. In short, the portable terminal determines which of the neighboring terminals include a GPS function and requests that they provide their GPS information and associated time to the portable terminal. The portable terminal may select at least three terminals that have a known angular spread between them so that there is some geographic distribution of the neighboring terminals. In addition, the portable terminal may also select neighboring terminals that have a signal strength greater than a known threshold so that neighboring terminals that are further away are not included in an further calculation. (so an algorithm may be that the neighboring terminal with the highest signal strength may be chosen as a reference and then each of the remaining neighboring terminals that respond are checked to determine that they have signal strength above a threshold value (the threshold may be determined as 3 dB below the signal strength of the reference terminal) and have a known angular separation from the reference terminal. Once, the terminals are selected, there may be a further selection to obtain those neighboring terminals with the highest signal strength and appropriate angular separation. The determination of location may then be performed based on the position information of the selected terminals by determining lines of intersection from the selected of neighboring terminals (triangulation) to determine the position of the portable terminal).

Figure 4:
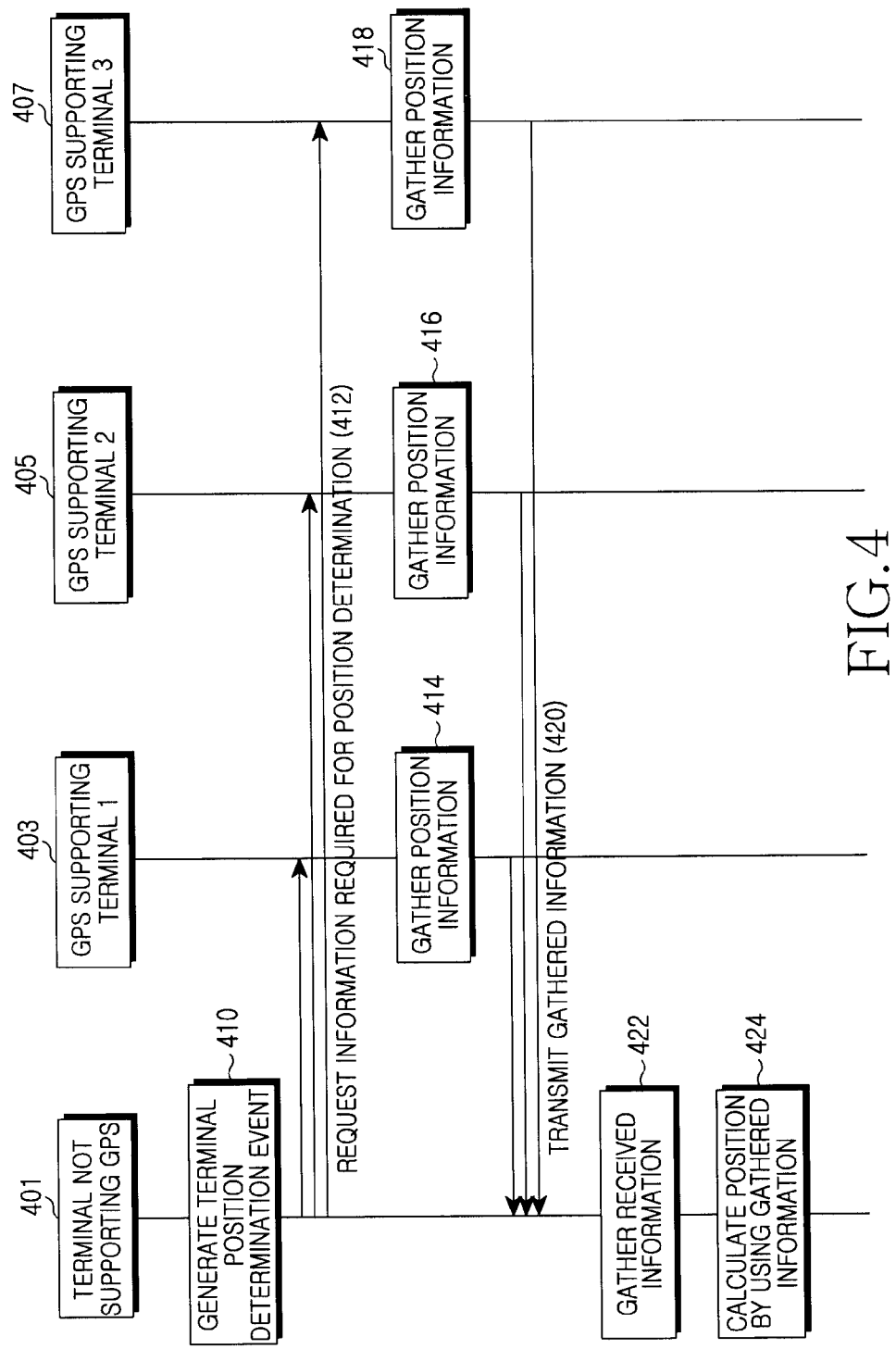
FIG. 4 illustrates a position determination operation of a portable terminal according to an exemplary embodiment of the present invention.

FIG. 4 illustrates a position determination operation of a portable terminal according to an exemplary embodiment of the present invention.

Referring to FIG. 4, it is assumed that the portable terminal can communicate with three neighbor terminals supporting a GPS function to calculate a current position.

The portable terminal is a terminal 401 not supporting the GPS function and cannot calculate the current position without the aid of other elements.

If an event for determining a position of the portable terminal 401 occurs in the aforementioned situation (step 410), the portable terminal 401 requests the (assumed) three neighbor terminals, i.e., terminals 403, 405, and 407 supporting the GPS function, to transmit information necessary for position determination (step S412).

In this case, the portable terminal 401 scans the $1^{st}$, $2^{nd}$, and $3^{rd}$ terminals supporting the GPS function among neighbor terminals and requests the terminals to transmit the information necessary for position determination.

As a result, the neighbor terminals 403, 405, and 407 supporting the GPS function gather position information (steps 414, 416, and 418), and transmit it to the portable terminal (step 420).

Thereafter, the portable terminal 401 gathers the position information received from the neighbor terminals 403, 405, and 407 supporting the GPS function (step 422), and calculates the current position of the portable terminal by using the information (step 424).

According to exemplary embodiments of the present invention, an apparatus and method for calculating a current position of a portable terminal not providing a function of obtaining position information, such as a Global Positioning System (GPS) function, by receiving the position information from neighbor terminals of the portable terminal are provided. The portable terminal not capable of receiving information regards neighbor terminals capable of receiving position information as satellites for providing position information and receives the position information from the terminals. Thus, a problem in which the conventional terminal not having the GPS function cannot perform accurate position calculation can be solved. As a result, the present invention can be a great help to recognize a position of a person stuck in a disaster area or a position of a mountain climber in a dangerous situation.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An apparatus for determining a current position of a portable terminal, the apparatus comprising:
    a controller for calculating the current position from received position information from neighbor terminals, the neighbor terminals having functions for determining their corresponding position, wherein the controller:
    establishes a communication connection to the neighbor terminals;
    scans the neighbor terminals for neighbor terminals having position determining functions,
    requests the neighbor terminals having position determining functions transmit their position information; and
    receives the position information corresponding to the request,
    wherein the neighbor terminals which have received the request of the position information gather position information and transmit the gathered position information to the portable terminal which has requested the information.

2. The apparatus of claim 1, wherein the communication connection uses near field communication protocol.

3. The apparatus of claim 1, wherein the controller calculates the current position by using the position information received from the neighbor terminals and a distance to the neighbor terminals.

4. The apparatus of claim 1, wherein the controller calculates the current position of the portable terminal by transmitting the position information received from the neighbor terminals to a specific server or specific terminal.

5. A method of determining a current position of a portable terminal, the method comprising:
    establishing, by a communication unit, a communication connection to neighbor terminals;
    scanning, by the communication unit, the neighbor terminals for neighbor terminals having position determining functions;
    requesting, by the communication unit, the neighbor terminals having position determining functions to gather position information and transmit the gathered position information to the portable terminal which has requested the position information;
    receiving, by the communication unit, the gathered position information from the neighbor terminals; and
    calculating, by a position calculator, the current position of the portable terminal by using the received gathered position information.

6. The method of claim 5, wherein the gathered position information received from the neighbor terminals comprises GPS information and associated time of the neighbor terminals.

7. The method of claim 5, wherein the communication connection is performed using a near field communication protocol.

8. The method of claim 5, wherein the calculating of the current position by using the received position information comprises:
    gathering the position information received from the neighbor terminals;
    determining a distance to the neighbor terminals; and
    calculating the current position using the position information received from the neighbor terminals and a distance to the neighbor terminals.

9. The method of claim 5, further comprising calculating the current position of the portable terminal by transmitting the position information received from the neighbor terminals to one of a specific server and a specific terminal.

10. The method of claim 5, wherein the neighbor terminals which have received the request of the position information gather position information and transmit the gathered position information to the portable terminal which has requested the information.

11. An apparatus for determining positioning of a portable device, the apparatus comprising:
    a transceiver unit; and
    a processor in communication with a memory, the memory including a code which when accessed by the processor causes the processor to:

scan an environment utilizing a near field communication protocol through the transceiving unit;

determine which of a plurality of neighboring terminals within the environment include position determining functions;

request positional information from those plurality of neighboring terminals including position determining functions; and determine a location based on positional information received through the transceiving unit in response to the request for positional information and a distance to each of the neighboring terminals providing the positional information.

12. The apparatus of claim 11, wherein the distance to each of the neighboring terminal is determined based on a received strength of the corresponding signal.

13. The apparatus of claim 11, wherein the location is determined based on triangulation using the received positional information and the corresponding distance.

14. The apparatus of claim 11 further comprising:
a display unit for displaying the determined location.

15. The apparatus of claim 11 further comprising:
an input unit for providing inputs to the processor.

* * * * *